Nov. 15, 1955  I. L. JONES  2,723,657
STONE CUTTING MACHINE
Filed Feb. 9, 1953  4 Sheets-Sheet 1

INVENTOR
IVO L. JONES
BY
Donald E. Lane
ATTORNEY.

Nov. 15, 1955  I. L. JONES  2,723,657
STONE CUTTING MACHINE
Filed Feb. 9, 1953  4 Sheets-Sheet 3

INVENTOR
IVO L. JONES
BY Donald E. Lane
ATTORNEY

Nov. 15, 1955 — I. L. JONES — 2,723,657
STONE CUTTING MACHINE
Filed Feb. 9, 1953 — 4 Sheets-Sheet 4
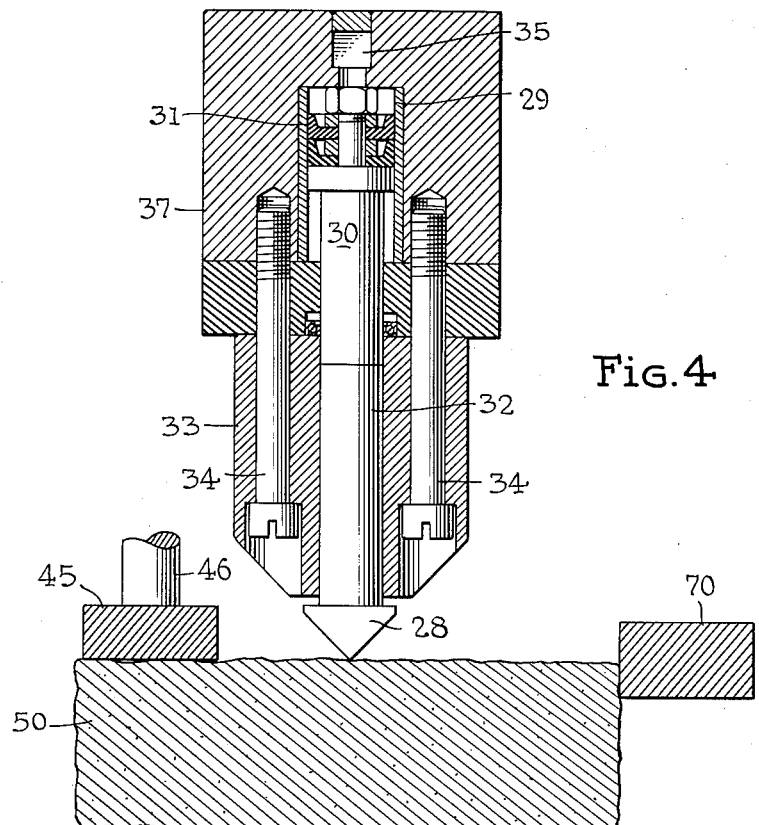
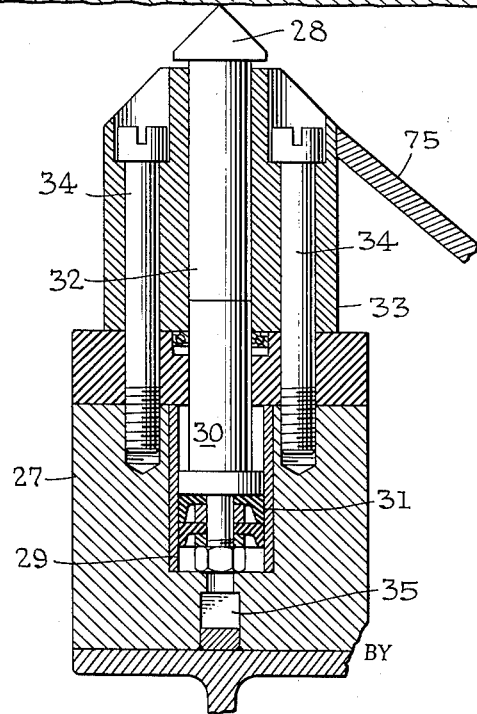
Fig. 4
INVENTOR
IVO L. JONES
Donald E. Lane
ATTORNEY.

United States Patent Office 2,723,657
Patented Nov. 15, 1955

2,723,657

STONE CUTTING MACHINE

Ivo L. Jones, Subiaco, Ark.

Application February 9, 1953, Serial No. 335,937

3 Claims. (Cl. 125—23)

This invention relates to apparatus for cutting or splitting stone into blocks or slabs of desired sizes, and relates more particularly to a hydraulically operated stone breaker.

Machines for breaking stratified stone slabs into smaller stones of desired size are well known as shown, for example, in the patent to Von B. Graham et al., 2,552,958, dated May 15, 1951, or P. M. Johanning, 2,152,193, dated March 28, 1939, or the patent to T. Siderits, 2,188,318, dated January 30, 1940. One of the problems of such stone breakers is the problem of maintaining the chisels in firm contact with the irregular stone surface when the impact is delivered to all the chisels to crack and sever the stone slab. It has been proposed to use a hydraulically operated wedge for moving each chisel against the surface of the slab to be cut. It has also been proposed to use spring-biased wedges between the chisels and a cross-head. It has also been proposed to provide hydraulic means to vibrate the chisels for forming a surface groove in the stone prior to the blow which cracks the stone. Because of the tremendous forces involved in cutting stone slabs by impact blows, prior chisel mounting constructions have not been strong enough to stand up for continuous use over long periods of time. The use of wedges causes difficulty when the wedges become damaged by the heavy forces they are required to transmit. Stone cutting chisels mounted for vibration to groove the stone slab are also too fragile to stand the impact forces.

It is an object of this invention to provide an improved stone cutting machine which is readily portable and yet of rugged construction to withstand long and hard usage.

It is another object of this invention to provide a hydraulically operated stone cutting machine in which the cutting chisels are evenly held against the uneven surface of the stone by hydraulic pressure.

It is a further object of this invention to provide a chisel mounting for a stone cutting machine which does not require the use of sliding wedges, nor the use of springs or pivot pins.

It is a still further object of this invention to provide an improved equalizing mounting for a plurality of alined chisels in a stone cutting machine.

Other objects and advantages of this invention will be readily apparent to those skilled in the stone cutter art from examination of the following description of the preferred construction illustrated in the accompanying drawings, wherein:

Figure 4 is an enlarged sectional view illustrating the mounting of opposed cutting chisels.

Figure 1:
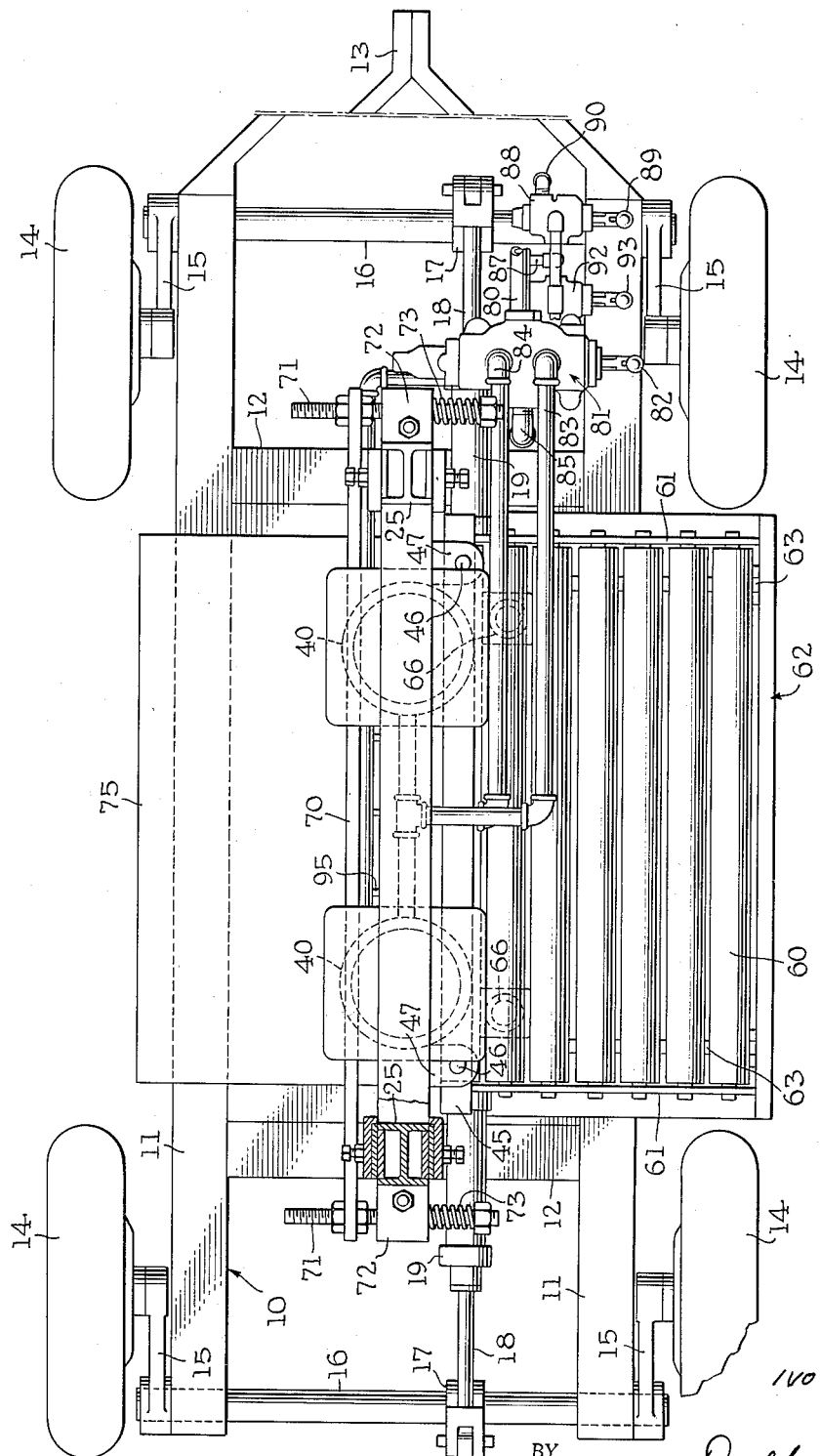
Figure 1 is a plan view of a portable stone cutting machine embodying this invention.

Referring to the drawings for the purposes of illustration, the frame of the stone cutting machine is indicated by the numeral 10. The frame 10 comprises two longitudinal channel members 11 and two cross frame members 12 forming a rectangular assembly having a suitable tongue connection 13 at the forward end for attachment to a tractor vehicle. The frame 10 is supported for movement on four wheels 14, each wheel being journaled on a wheel supporting arm 15 secured to a cross shaft 16 which is journaled in the ends of the side frame members 11. Each cross shaft 16 is provided with a crank arm 17 connected by a rod 18 to a piston in a double-acting hydraulic cylinder 19, the end of the cylinder 19 being secured by a pivotal connection 20 and angle 21 to the main horizontal beam 22. The beam 22 is secured to the cross members of the frame 10. The admission of fluid under pressure to the hydraulic cylinders 19 is utilized to turn the shaft 16 for raising and lowering the wheels 14 with respect to the frame 10. When the wheels 14 are lowered, the frame 10 is lifted off the ground for movement on the wheels to a new location. When the stone cutting machine is to be used for cutting stone, the wheels 14 are raised to permit the frame 10 to rest on the ground or on any other firm support.

The main horizontal beam 22 is mounted on and extends between the cross frame beams 12. At each end of beam 22 is an upright channel post 25, and the tops of posts 25 are connected by a head beam 26. A longitudinal tool equalizer block 27 is secured to the top of main beam 22 and an alined series of stone cutting chisels 28 are supported by the tool block 27. The tool block 27 is provided with a plurality of vertical cylinders 29, and each cylinder is provided with an equalizing tappet 30 having packing 31 on the lower and piston end of the tappet. The stone cutting chisels 28 are each provided with a stem 32 guided in a bore in the member 33, the latter being secured to the tool block 27 by bolts 34. The lower portion of tool block 27 is provided with a longitudinal oil passage or cavity 35 in communication with all of the cylinders 29. The upper end of tappet 30 engages the lower end of stem 32.

Figure 2:
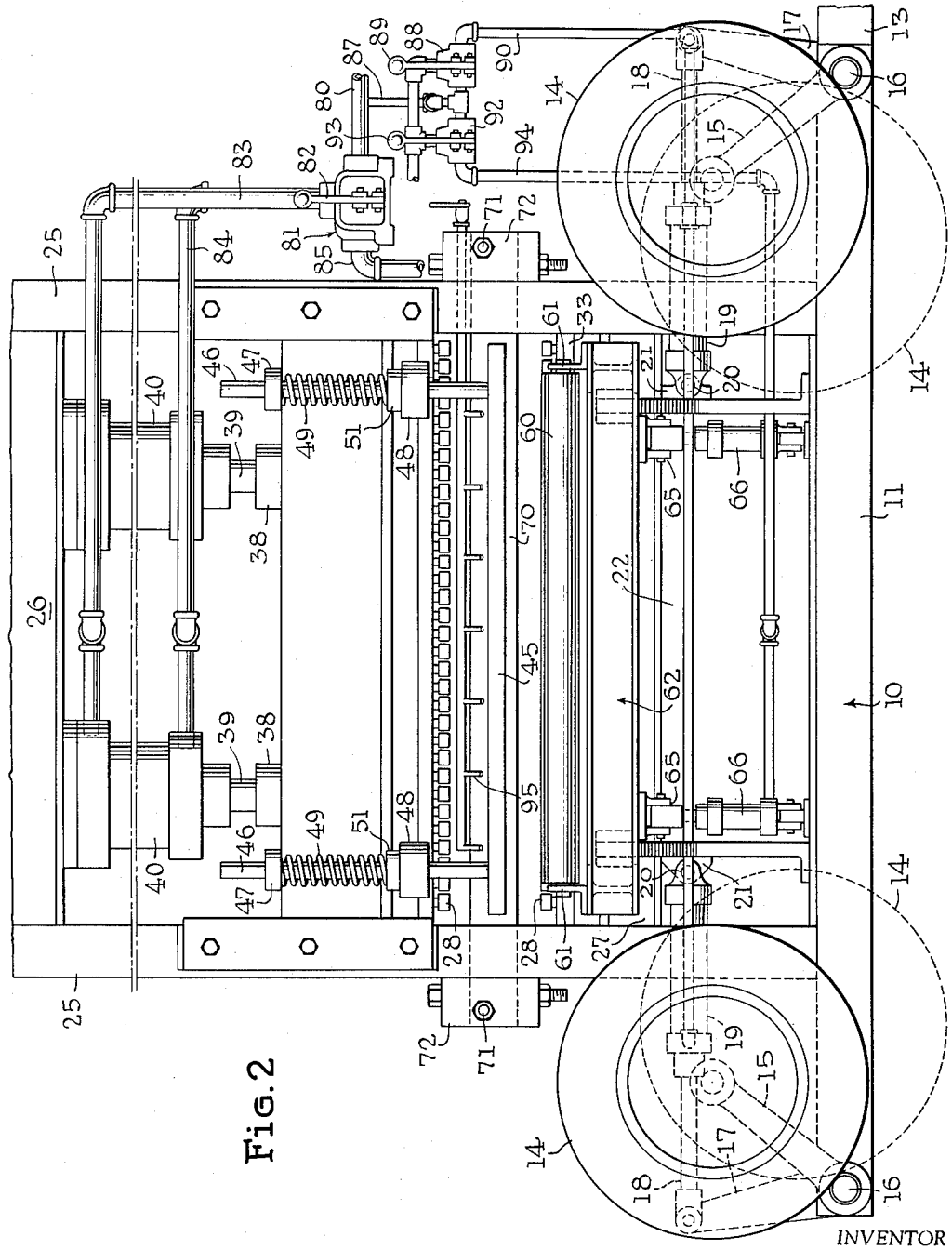
Figure 2 is a side view of the machine shown in Figure 1.
Figure 3:
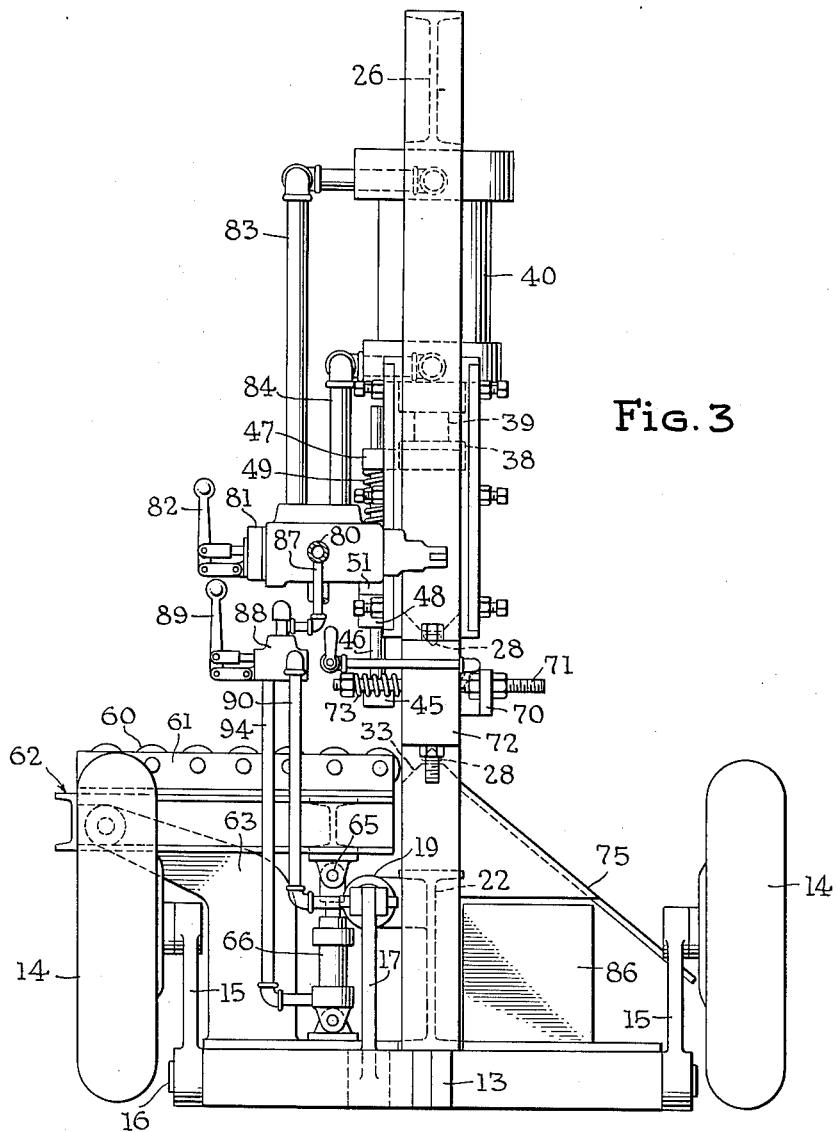
Figure 3 is an end view of the machine shown in Figure 1.

The upper series of stone chisels 28 is mounted in a longitudinal ram block 37 similar to block 27 but mounted for up and down sliding movement on the vertical posts 25. The ram block 37 is provided, as shown in Figure 4, with cylinders, tappets, and a longitudinal oil passage 35 the same as provided in the lower block 27 described heretofore. The ram block 37 is mounted on a longitudinal beam connected by knuckles 38 to the piston rods 39 of a pair of double-acting hydraulic cylinders 40, the latter being secured to the head beam 26. Referring to Figures 2 and 3, a hold-down bar 45 is suspended by rods 46 supported by guides 47 and 48 extending laterally from the ram beam. The bar 45 is adapted to resiliently engage the upper surface of slab stone during cutting, and for this purpose a compression spring 49 is provided between the upper guide 47 and a collar 51 secured on the rod 46 to urge the hold-down bar 45 downward.

The stone cutting machine illustrated in the drawings includes a loading table assembly comprising a plurality of horizontal rollers 60 journaled in parallel end members 61 carried by a frame 62. The outer end of frame 62 is pivotally supported by rigid supporting arms 63 secured to one of the frame members 11. The end of the roller table frame 62 toward the cutting chisels 28 is connected by pivotal connections 65 to a pair of double-acting hydraulic cylinders 66 also fastened to the machine frame 10. The application of fluid pressure to the cylinders 66 is used to raise and lower the inner end of the loading table assembly. During loading, the table is raised so that a slab of stone may be advanced on the rollers until it projects over the lower series of chisels 28. The table is then lowered until the inner portion of the stone 50 rests on the lower series of chisels 28.

A horizontal gage bar 70 is secured to the upright posts 25 by adjustable studs 71 slidably mounted in members 72 and provided with shock absorbing springs 73. The members 72 are secured to the posts 25. As shown in Figure 4, the gage bar 70 serves as a stop to limit the movement of the stone slab 50 over the loading table rollers 60. The position of the bar 70 is adjustable to provide for cutting stone in strips of a desired lateral width. A delivery surface or chute 75 is secured to the machine frame by suitable supports so that strips of stone 50 cut by the chisels 28 may slide downward to a position clear of the machine frame.

The hydraulic system includes supply inlet 80 for connection to a suitable external source of fluid pressure. The inlet connection is connected to a control valve 81 operated by a lever 82 to admit fluid under pressure through conduit 83 extending to one side of the ram cylinders 40 and to connect the conduit 84 to a conduit 85 leading to a sump tank 86. The valve 81 is operable to supply pressure to raise the ram block 37 during loading as well as to press the ram block downward for stone cutting. A branch line 87 from the inlet 80 leads to another control valve 88 operated by a lever 89 to supply fluid pressure through conduits 90 to the hydraulic cylinders 19 for raising or lowering the wheels 14 with respect to the frame 10. Also connected to branch line 87 is a second control valve 92 operated by a lever 93 to supply fluid pressure through conduits 94 to the hydraulic cylinders 66 for raising and lowering the loading table frame 62. Valves 88 and 92 connect one end of the cylinders 19 and 66 to the sump tank 86 when pressure is being admitted to the other end of said cylinders. An external source of hydraulic pressure, such as a motor driven pump, may draw its supply from the tank 86. A series of nozzles 95 may be spaced along the line of cutting chisels 28 for supplying compressed air to blow chips from the stone slab 50 prior to cutting. The air nozzles 95 may be connected through a valve 96 to an external source of air under pressure.

The operation of the illustrated stone cutter will now be described. Prior to a stone cutting operation, the apparatus is towed to a desired location on wheels 14 and the wheels are then raised to allow the frame 10 to rest on solid ground or on any prepared firm support. The longitudinal oil passages 35 in the tool block 27 and the upper or ram block 37 are filled with oil to exclude air and to fill all the cylinders 29 of the blocks. The inner end of the loading table is raised by hydraulic cylinders 66, and the stop 70 is secured a desired horizontal distance from the vertical plane of the cutting chisels 28 to provide for cutting a strip of stone of desired width. A slab 50 of stone to be cut is loaded by moving it over the rollers 60 until a straight edge of the slab abuts the stop 70. The inner end of the loading table is then lowered by cylinders 66 until the edge of the stone slab 50 is supported by the lower line of chisels 28. Since the chisels 28 in tool block 27 are hydraulically supported by the oil confined in the respective cylinders 29 interconnected by the oil cavity 35, each chisel may adjust itself up or down with respect to adjacent chisels to engage stone of relatively rough surface. Even though the surface of the stone is relatively rough, each chisel 28 engages the stone 50 with the same force as every other chisel because of the hydraulic interconnection of the cylinder 29. Next, the ram beam and upper ram block 37 is lowered by operation of valve lever 82 which admits hydraulic pressure to the upper ends of ram cylinders 40. As the ram block 37 lowers, the upper surface of the stone slab is first engaged by the resiliently mounted hold down bar 45. Then as the ram block is further urged downward by hydraulic pressure, the upper series of cutting chisels 28 engage the upper surface of the stone 50 vertically above the lower series of chisels. The upper chisels 28 being individually mounted and backed by intercommunicating hydraulic pressure also engage rough stone surfaces with equal pressures. Continued downward movement of the ram block 37 causes the cutting chisels 28 to evenly cut a strip of stone from the stone slab 50. The cut strip falls away from the chisels 28 and slides over chute 75 to the ground. The ram block 37 is then raised, the loading table is raised, and the stone slab is advanced against the stop 70 for the next cutting operation. The ram cylinders 40 may be approximately ten inches in diameter and may be supplied with oil under sufficient pressure to provide a combined cutting pressure of the order of seventy-eight tons. The oil cavities 35 in the chisel blocks are sealed closed after being filled with oil and no external fluid pressure is applied to said oil during operation of the cutting machine.

The mounting of the cutting chisels as shown and described is found to result in even cutting of relatively rough surface stone slabs and causes minimized chip waste. Between each cutting operation, stone chips and dust may be blown from the surface of the stone slab 50 by means of nozzles 95 connected to a supply of compressed air through valve 96.

Various modifications as well as other advantages of this invention will be readily apparent to those skilled in the art, and it will be obvious that many changes in minor details, proportions and design may be carried out within the scope of the appended claims.

What is claimed is:

1. In apparatus for cutting stone into blocks of desired size by means of opposed rows of cutting chisels mounted for movement of one row of chisels toward the other row of chisels, an improved longitudinally extending chisel mounting assembly for each row of chisels, each of said mounting assemblies comprising in combination: a longitudinally extending block having a plurality of vertical cylinders therein; means defining a closed longitudinal oil cavity complete within said block and being entirely sealed from communication exteriorly thereof connecting the inner end of each of said cylinders; a longitudinally extending member secured to said block and having a plurality of bores therein aligned with said cylinders for supporting and guiding a plurality of movable chisels; and an equalizing tappet mounted in each cylinder and adapted to engage one end of a cutting chisel mounted in the corresponding bore of said member; whereby said cylinders, tappets, and closed cavity form a closed pressure equalizing system complete within said mounting assembly to confine said oil to one end of each of said tappets.

2. A chisel mounting assembly as defined in claim 1, in which the diameter of said bores is less than the diameter of said cylinders, and each of said equalizing tappets extends into said bore and is rigidly secured to its respective stone cutting chisel.

3. Apparatus for cutting stone into blocks of desired size by means of upper and lower rows of cutting chisels mounted for the movement of the upper row of chisels toward the lower row of chisels, said apparatus comprising in combination: a mounting assembly for the lower row of chisels including a longitudinal rigid block having a plurality of cylinders therein aligned with the chisels of said row; tappets mounted in said cylinders engaging said chisels; and means defining a closed longitudinal cavity complete within said block and being entirely sealed from communication exteriorly thereof connecting the outer ends of all of said cylinders and filled with oil; a loading assembly including a plurality of horizontal rollers journaled in a pivotally supported frame and including means to lower one side of said frame to position stone to be cut upon said lower row of chisels; a mounting assembly for the upper row of chisels including a longitudinal ram block mounted for movement in a vertical plane toward and away from said mounting assembly for said lower row of chisels, said upper mounting assembly including a plurality of cylinders in said ram block aligned with the chisels of said upper row, tappets mounted in said cylinders engaging said chisels, and a closed longitudinal cavity complete in said ram block and being entirely sealed from communication exteriorly thereof connecting all of said cylinders and filled with oil; and hydraulic means for moving said upper chisel mounting assembly toward and away from the stone supported by said loading assembly and lower row of chisels.

References Cited in the file of this patent

UNITED STATES PATENTS

| | | |
|---|---|---|
| 247,569 | Maxim | Sept. 27, 1881 |
| 2,188,318 | Siderits | Jan. 30, 1940 |
| 2,452,706 | White | Nov. 2, 1948 |
| 2,514,352 | Solomito | July 4, 1950 |
| 2,557,098 | Graham | June 19, 1951 |
| 2,582,694 | Gundlach | Jan. 15, 1952 |